United States Patent
Gokhale et al.

(10) Patent No.: US 11,886,379 B2
(45) Date of Patent: Jan. 30, 2024

(54) SYSTEM AND METHOD OF PARTIAL COMPILATION WITH VARIATIONAL ALGORITHMS FOR QUANTUM COMPUTERS

(71) Applicant: University of Chicago, Chicago, IL (US)

(72) Inventors: Pranav Gokhale, Chicago, IL (US); Yongshan Ding, Chicago, IL (US); Thomas Propson, Chicago, IL (US); Frederic T. Chong, Chicago, IL (US)

(73) Assignee: THE UNIVERSITY OF CHICAGO, Chicago, IL (US)

( * ) Notice: Subject to any disclaimer, the term of this patent is extended or adjusted under 35 U.S.C. 154(b) by 123 days.

(21) Appl. No.: 17/641,036

(22) PCT Filed: Sep. 9, 2020

(86) PCT No.: PCT/US2020/049932
§ 371 (c)(1),
(2) Date: Mar. 7, 2022

(87) PCT Pub. No.: WO2021/050541
PCT Pub. Date: Mar. 18, 2021

(65) Prior Publication Data
US 2022/0374390 A1    Nov. 24, 2022

Related U.S. Application Data

(60) Provisional application No. 62/900,120, filed on Sep. 13, 2019.

(51) Int. Cl.
*G06F 9/02* (2006.01)
*G06F 15/82* (2006.01)
*G06N 10/40* (2022.01)

(52) U.S. Cl.
CPC ............ *G06F 15/82* (2013.01); *G06N 10/40* (2022.01)

(58) Field of Classification Search
CPC ................................ G06F 15/82; G06N 10/40
See application file for complete search history.

(56) References Cited

U.S. PATENT DOCUMENTS 11,042,685 B2 * 6/2021 Martiel ................. G06F 30/367
11,194,573 B1 * 12/2021 Smith .................... G06N 10/40
(Continued)

FOREIGN PATENT DOCUMENTS

JP         2013114366 A  *  6/2013

OTHER PUBLICATIONS

Gokhale, Partial Compilation of Variational Algorithms for Noisy Intermediate-Scale Quantum Machines, 2019, ACM MICRO-52, pp. 266-278. (Year: 2019).*

*Primary Examiner* — Cheng Yuan Tseng
(74) *Attorney, Agent, or Firm* — Armstrong Teasdale LLP

(57) ABSTRACT

A computing system includes a quantum processor with qubits, a classical memory including a quantum program defining a plurality of instructions in a source language, and a classical processor configured to: (i) receive a circuit of gates representing a quantum program for a variational algorithm in which computation is interleaved with compilation; (ii) identify a plurality of blocks, each block includes a subcircuit of gates, leaving one or more remainder subcircuits of the circuit of gates outside of the plurality of blocks; (iii) pre-compile each block of the plurality of blocks with a pulse generation program to generate a plurality of pre-compiled blocks including control pulses configured to perform the associated block on the quantum processor; and (iv) iteratively execute the quantum program using the pre-compiled blocks as static during runtime and recompil- (Continued)

ing the one or more remainder subcircuits on the classical processor at each iteration of execution.

20 Claims, 6 Drawing Sheets

(56) References Cited

U.S. PATENT DOCUMENTS

| | | | | |
|---|---|---|---|---|
| 11,416,228 | B2* | 8/2022 | Chong | G06N 10/80 |
| 11,562,284 | B1* | 1/2023 | Ryan | G06F 9/4843 |
| 11,599,344 | B2* | 3/2023 | Cao | G06F 8/443 |
| 2019/0042965 | A1* | 2/2019 | Clarke | G06F 8/443 |
| 2021/0357797 | A1* | 11/2021 | Karalekas | G06N 10/00 |
| 2022/0084085 | A1* | 3/2022 | Rigetti | G06Q 30/0283 |
| 2022/0108218 | A1* | 4/2022 | Wall | G06N 20/00 |
| 2022/0374390 | A1* | 11/2022 | Chong | G06F 15/82 |
| 2022/0398483 | A1* | 12/2022 | Chernoguzov | G06N 10/20 |
| 2023/0099621 | A1* | 3/2023 | Shi | G06N 3/08 717/140 |
| 2023/0112525 | A1* | 4/2023 | Naveh | G06N 10/00 716/100 |
| 2023/0244459 | A1* | 8/2023 | Zou | G06F 8/447 717/140 |

* cited by examiner

US 11,886,379 B2

SYSTEM AND METHOD OF PARTIAL COMPILATION WITH VARIATIONAL ALGORITHMS FOR QUANTUM COMPUTERS

CROSS REFERENCE TO RELATED APPLICATIONS

This application is a U.S. National Stage Entry of International Patent Application No. PCT/US2020/049932, filed Sep. 9, 2020, which claims the benefit of priority to U.S. Provisional Patent Application Ser. No. 62/900,120, entitled SYSTEM AND METHOD OF PARTIAL COMPILATION WITH VARIATIONAL ALGORITHMS FOR QUANTUM COMPUTERS, filed Sep. 13, 2019, the entire contents of which are incorporated herein by reference in its entirety.

STATEMENT REGARDING FEDERALLY SPONSORED RESEARCH & DEVELOPMENT

This invention was made with government support under grant numbers CCF1730449, and PHY1818914 awarded by The National Science Foundation. The government has certain rights in the invention.

TECHNICAL FIELD

This disclosure relates generally to quantum computing and, more specifically, to systems and methods for partial compilation with variational algorithms for quantum computers.

BACKGROUND

Recent developments in quantum computing have pushed quantum computers closer to solving classically intractable problems. Existing quantum programming languages and compilers use a quantum assembly language composed of 1- and 2-quantum bit ("qubit") gates to prepare and execute primitive operations on quantum computers. Recent advancements in hardware and software include devices such as IBM's 50-qubit quantum machine and Google's 72-qubit machine, as well as classical-quantum hybrid algorithms tailored for such Noisy Intermediate-Scale Quantum ("NISQ") machines, such as Quantum Approximate Optimization Algorithm ("QAOA") and Variational Quantum Eigensolver ("VQE").

Some of the most promising algorithms for these NISQ machines are variational algorithms. Conventional variational algorithms in Quantum Computing employ classical optimization coupled with quantum hardware to evaluate the quality of each candidate solution. Recent work used Gradient Descent Pulse Engineering ("GRAPE") to translate quantum programs into highly optimized machine control pulses, resulting in a significant reduction in the execution time of programs. Such optimization can be generally important in conventional computing, but becomes of far more significant importance in quantum computing as these machines can support only short execution times before failing.

GRAPE, however, suffers from high compilation latency. For example, running GRAPE control on a circuit with just four qubits can take many minutes, even with state-of-the-art hardware and graphics processing unit (GPU) acceleration. As circuits become longer (e.g., more gates) and broader (e.g., more qubits), compilation can take hours or days. In the NISQ era, quantum hardware with hundreds or thousands of qubits are anticipated. With variational algorithms, where computation is interleaved with compilation at runtime, such high compilation costs are a further burden because recompilation is performed many times during execution.

What are needed are compilation strategies that improve compilation times for variational algorithms.

BRIEF DESCRIPTION

In one aspect, a computing system for compiling and executing instructions on a quantum processor is provided. The system includes the quantum processor including a plurality of qubits. The system also includes a classical memory including a quantum program. The quantum program defines a plurality of instructions in a source language. The system further includes a classical processor communicatively coupled to the classical memory. The memory includes computer-executable instructions that, when executed by the classical processor, cause the classical processor to receive a circuit of gates representing a quantum program for a variational algorithm in which computation is interleaved with compilation at each iteration. The instructions also cause the classical processor to identify a plurality of blocks within the circuit of gates. Each block of the plurality of blocks includes a subcircuit of gates from the circuit of gates, leaving one or more remainder subcircuits of the circuit of gates outside of the plurality of blocks. The instructions further cause the classical processor to pre-compile each block of the plurality of blocks with a pulse generation program to generate a plurality of pre-compiled blocks. Each pre-compiled block includes control pulses configured to perform the associated block on the quantum processor. The instructions also cause the classical processor to iteratively execute the quantum program on the quantum processor using the pre-compiled blocks as static during runtime and recompiling the one or more remainder subcircuits on the classical processor at each iteration of execution.

In another embodiment, a computer-implemented partial compilation method for compiling and executing instructions on a quantum computer is provided. The method is implemented using a classical processor in communication with a classical memory. The method includes receiving a circuit of gates representing a quantum program for a variational algorithm. The method also includes identifying a plurality of blocks within the circuit of gates. Each block of the plurality of blocks includes a subcircuit of gates from the circuit of gates, leaving one or more remainder subcircuits of the circuit of gates outside of the plurality of blocks. The method further includes pre-compiling each block of the plurality of blocks with gradient ascent pulse engineering to generate a plurality of pre-compiled blocks. Each pre-compiled block includes control pulses configured to perform the associated block on the quantum processor. The method also includes iteratively executing the quantum program on the quantum processor using the pre-compiled blocks as static during runtime and recompiling the one or more remainder subcircuits on the classical processor at each iteration of execution.

In yet another embodiment, a non-transitory computer-readable storage media having computer-executable instructions embodied thereon is provided. When executed by at least one classical processor, the computer-executable instructions cause the classical processor to receive a circuit of gates representing a quantum program for a variational algorithm. The instructions also cause the classical processor to identify a plurality of blocks within the circuit of gates. Each block of the plurality of blocks includes a subcircuit of gates from the circuit of gates, leaving one or more remainder subcircuits of the circuit of gates outside of the plurality of blocks. The instructions further cause the classical processor to pre-compile each block of the plurality of blocks with gradient ascent pulse engineering to generate a plurality of pre-compiled blocks. Each pre-compiled block including control pulses configured to perform the associated block on the quantum processor. The instructions also cause the classical processor to iteratively execute the quantum program on a quantum processor using the pre-compiled blocks as static during runtime and recompiling the one or more remainder subcircuits on the classical processor at each iteration of execution.

BRIEF DESCRIPTION OF THE DRAWINGS

FIGS. 1-4C show exemplary embodiments of the methods and systems described herein.

FIG. 1 is a diagram of exemplary quantum computing system for executing variational quantum programs on a quantum computing device.

FIG. 2 is a component diagram of the compilation engine 114 shown in FIG. 1.

FIG. 3 is an example variational circuit for the variational quantum program shown in FIG. 1.

FIG. 4C illustrates blocking of parameterized subcircuits that depend on only a single variational parameter.

DETAILED DESCRIPTION OF THE DISCLOSURE

Figure 1:
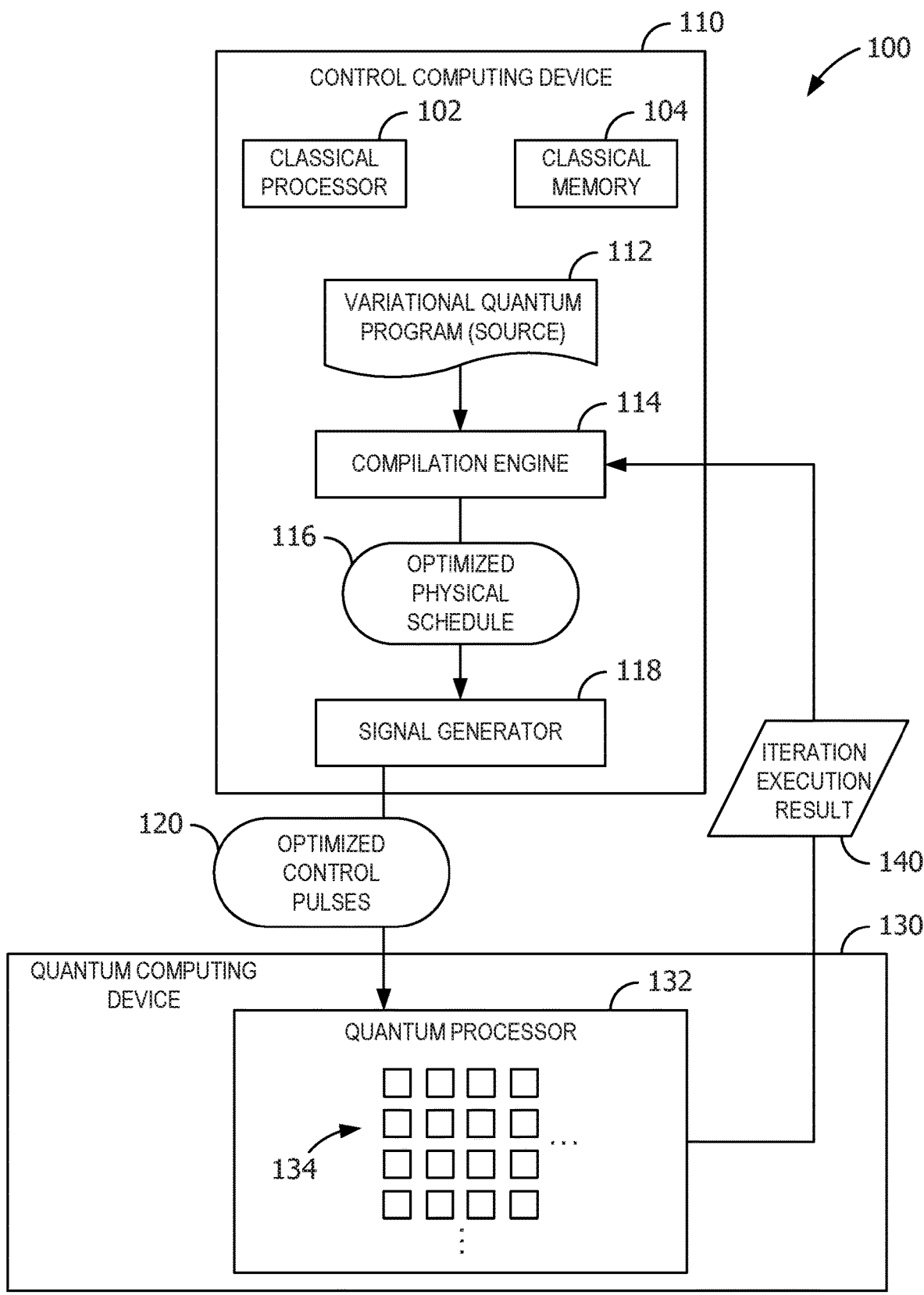

The following detailed description illustrates embodiments of the disclosure by way of example and not by way of limitation. It is contemplated that the disclosure has general application to quantum computing.

Existing quantum programming languages and compilers use a quantum assembly language composed of 1- and 2-qubit gates. Quantum compiler frameworks translate this quantum assembly into control pulses, typically electric signals that implement the specified computation on a specific quantum computing device. Such quantum programs ("non-variational algorithms") are typically compiled once and then executed on the quantum computing device. Typical non-variational quantum algorithms are completely specified at compilation time and therefore can be fully optimized by static compilation tools before execution. However, variational algorithms (or "hybrid quantum-classical algorithms") interleave compilation with computation, necessitating recompilation during runtime (e.g., as the program iterates toward a solution). Each iteration of a variational algorithm depends on the results of the previous iteration. As such, compilation is interleaved with computation. As even small instances of variational algorithms typically perform thousands of iterations, the compilation latency for each iteration becomes a significant limitation, causing a significant departure from conventional non-variational quantum algorithms. Examples of such variational algorithms include molecular ground state estimation, MAXCUT approximation, and prime factorization. While GRAPE compilation of non-variational algorithms is known to outperform gate-based compilation, GRAPE-based compilation incurs a substantial cost in compilation time. In variational algorithms, GRAPE-based compilation would be magnified by the iterative recompilation.

A quantum computing system and associated methods are described herein for addressing these problems. The quantum computing system described herein includes a compilation engine (e.g., executed on a classical computing device) that is configured to prepare and optimize a quantum program for execution on a quantum processor. In some instances, the quantum processor may include tens, hundreds of qubits for use in execution, with thousands of qubits expected in the future. The compilation engine is configured to prepare and execute variational algorithms on the quantum processor using partial compilation strategies prior to runtime that can improve compilation latency during runtime (e.g., increasing runtime compilation efficiency, reducing runtime compilation time).

The term "classical," as used herein, refers to conventional transistor-based computing technology. This term, where necessary, is used to distinguish conventional computing devices or associated hardware, software, algorithms, and such, from "quantum" computing. Quantum computing devices or associated hardware, software, algorithms, and such, are typically distinguished from classical computing devices based on their reliance on quantum phenomena of quantum mechanics to perform processing operations. Example classical computing devices include conventional personal computers, servers, tablets, smartphones, x86-based processors, random access memory ("RAM") modules, and so forth. Example quantum computing devices include "IBM Q" devices from International Business Machines (IBM), "Bristlecone" quantum computing device from Google, "Tangle Lake" quantum computing device from Intel, and "2000Q" from D-Wave. The term "classical bit" or "cbit" may be used herein to refer to a bit within classical computing. The term "qubit" may be used herein to refer to a quantum bit in quantum computing.

FIG. 1 is a diagram of exemplary quantum computing system 100 for executing variational quantum programs on a quantum computing device 130. The quantum computing system 100 includes a control computing device 110 that is configured to prepare (e.g., compile and optimize) a quantum program 112 for execution on the quantum computing device 130. The control computing device 110 includes a classical processor 102 (e.g., a central processing unit ("CPU"), an x86-based processor, or the like) that can be configured to execute classical processor instructions, a classical memory 104 (e.g., random access memory ("RAM"), memory SIMM, DIMM, or the like, that includes classical bits of memory). The quantum computing device 130 includes multiple qubits 134 that represent a quantum processor 132 upon which the quantum program 112 is executed. In the example embodiment, the quantum program 112 is a variational quantum program that interleaves compilation with computation during runtime, and the quantum processor 132 includes 50 or 100 qubits, but it should be understood that the present disclosure is envisioned to be operable and beneficial for quantum processors with many tens, hundreds, or more qubits 134.

The fundamental unit of quantum computation is a quantum bit, or qubit 134. In contrast to classical bits ("cbits"), qubits are capable of existing in a superposition of logical states, notated herein as $|0\rangle$ and $|1\rangle$. The general quantum state of a qubit may be represented as:

$$|\psi 1\rangle = \alpha|0\rangle + \beta|1\rangle,$$

where α, β are complex coefficients with $|α|^2+|β|^2=1$. When measured in the 0/1 basis, the quantum state collapses to $|0\rangle$ or $|1\rangle$ with a probability of $|α|^2$ and $|β|^2$, respectively. The qubit 134 can be visualized as a point on a 3D sphere called the Bloch sphere. Qubits 134 can be realized on different Quantum Information Processing (QIP) platforms, including ion traps, quantum dot systems, and, in the example embodiment, superconducting circuits. The number of quantum logical states grows exponentially with the number of qubits 134 in the quantum processor 132. For example, a system with three qubits 134 can live in the superposition of eight logical states: $|000\rangle$, $|001\rangle$, $|010\rangle$, $|011\rangle$, ... $|111\rangle$. This property sets the foundation of potential quantum speedup over classical computation. In other words, an exponential number of correlated logical states can be stored and processed simultaneously by the quantum system 100 with a linear number of qubits 134.

A quantum algorithm may be described in terms of a quantum circuit. During quantum compilation, the quantum program 112 is first decomposed into a set of 1- and 2-qubit discrete quantum operations called logical quantum gates. These quantum gates are represented in matrix form as unitary matrices. 1-qubit gates correspond to rotations along a particular axis on the Bloch sphere. In an example quantum ISA, the 1-qubit gate set may include rotations along the x-, y-, and z-axes of the Block sphere. Such gates are notated herein as $R_x$, $R_y$, and $R_z$ gates, respectively. Further, the quantum ISA may also include a Hadamard gate, which corresponds to a rotation about the diagonal x+z axis. An example of a 2-qubit logical gate in the quantum ISA is a Controlled-NOT ("CNOT" or "CX") gate, which flips the state of the target qubit if the control qubit is $|1\rangle$ or leaves the state unchanged if the control qubit is $|0\rangle$. For example, the CX gate sends $|10\rangle$ to $|11\rangle$, sends $|11\rangle$ to $|10\rangle$, and preserves the other logical states.

Further, it should be understood that the general logical assembly instructions typically used during compilation of the variational quantum program 112 were designed without direct consideration for the variations in the types of physical hardware that may be used. As such, there is often a mismatch between the logical instructions and the capabilities of the particular QIP platform. For example, on some QIP platforms, it may not be obvious how to implement the CX gate directly on that particular physical platform. As such, a CX gate may be further decomposed into physical gates in a standard gate-based compilation. Other example physical quantum gates for various architectures include, for example, in platforms with Heisenberg interaction Hamiltonian, such as quantum dots, the directly implementable 2-qubit physical gate is the $\sqrt{SWAP}$ gate (which implements a SWAP when applied twice). In platforms with ZZ interaction Hamiltonian, such as superconducting systems of Josephson flux qubits and NMR quantum systems, the physical gate is the CPhase gate, which is identical to the CX gate up to single qubit rotations. In platforms with XY interaction Hamiltonian, such as capacitively coupled Josephson charge qubits (e.g., transmon qubits), the 2-qubit physical gate is iSWAP gate. For trapped ion platforms with dipole-chain interaction, two popular physical 2-qubit gates are the geometric phase gate and the XX gate.

The quantum processor 132 can be continuously driven by external physical operations to any state in the space spanned by the logical states. The physical operations, called control fields, are specific to the underlying system, with control fields and system characteristics controlling a unique and time-dependent quantity called the Hamiltonian. The Hamiltonian determines the evolution path of the quantum states. For example, in superconducting systems such as the example quantum computing device 130, the qubits 134 can be driven to rotate continuously on the Bloch sphere by applying microwave electrical signals. By varying the intensity of the microwave signal, the speed of rotation of the qubit 134 can be manipulated. The ability to engineer the system Hamiltonian in real time allows the quantum computing system 100 to direct the qubits 134 to the quantum state of interest through precise control of related control fields. Thus, quantum computing may be achieved by constructing a quantum system in which the Hamiltonian evolves in a way that aligns with high probability upon final measurement of the qubits 134. In the context of quantum control, quantum gates can be regarded as a set of pre-programmed control fields performed on the quantum processor 132.

During operation, the control computing device 110 implements a quantum algorithm, attempting to create as efficient a quantum circuit as possible, where efficiency may be in terms of circuit width (e.g., number of qubits) and depth (e.g., length of critical path, or runtime of the circuit). In some embodiments, the compilation engine 114 optimizes various circuits or subcircuits using IBM Qiskit Transpiler, which applies a variety of circuit identities (e.g., aggressive cancellation of CX gates and Hadamard gates). In some embodiments, the compilation engine 114 also performs additional merging of rotation gates (e.g., $R_x(α)$ followed by $R_x(β)$ merges into $R_x(α+β)$) to further reduce circuit sizes.

At the lowest level of hardware, quantum computers are controlled by analog pulses. Therefore, quantum compilation translates from a high level quantum algorithm down to a sequence of control pulses 120. Once a quantum algorithm has been decomposed into a quantum circuit comprising single- and two-qubit gates, gate-based compilation can be performed by concatenating a sequence of pulses corresponding to each gate. In particular, a lookup table maps from each gate in the gate set to a sequence of control pulses that executes that gate. Pure gate-based compilation provides an advantage in short pulse compilation time, as the lookup and concatenation of pulses can be accomplished very quickly. Some known methods of compilation for variational algorithms use the gate-based approach to compilation, using parameterized gates such as $R_x(θ)$ and $R_z(\phi)$. However, the pure gate-based compilation approach prevents the optimization of pulses from happening across the gates because there might exist a global pulse for an entire circuit that is shorter and more accurate than the concatenated one. The quality of the concatenated pulse relies heavily on an efficient gate decomposition of the quantum algorithm. GRAPE is a strategy for compilation that numerically finds the best control pulses needed to execute a quantum circuit or sub-circuit by following a gradient descent procedure. In contrast to the gate based approach, GRAPE does not have the limitation incurred by the gate decomposition. Instead, the GRAPE-based approach directly searches for the optimal control pulse for the input circuit as a whole. Some embodiments described herein utilize GRAPE for portions of compilation, as described in further detail below.

In the example embodiment, the control computing device 110 includes a compilation engine 114 that, during operation, is configured to compile the variational quantum program 112 (e.g., from source code) into an optimized physical schedule 116. The quantum computing device 130 is a superconducting device and the signal generator 118 is an arbitrary wave generator ("AWG") configured to perform the optimized control pulses 120 on the quantum processor 132 (e.g., via microwave pulses sent to the qubits 134, where the axis of rotation is determined by the quadrature amplitude modulation of the signal and where the angle of rotation is determined by the pulse length of the signal). The optimized physical schedule 116 represents a set of control instructions and associated schedule that, when sent to the quantum computing device 130 as optimized control pulses 120 (e.g., the pre-programmed control fields) by a signal generator 118, cause the quantum computing device 130 to execute the quantum program 112, thereby generating an execution result 140. In the example embodiment, the iteration execution result 140 is sent back to the compilation engine 114 and the compilation engine 114 performs additional compilation to generate a new optimized physical schedule for the next iteration. It should be understood that other quantum computing architectures may have different supporting hardware.

In some example embodiments, the variational quantum program 112 may be a Variational Quantum Eigensolver (VQE). The quantum computing system 100 may use VQE to find the ground state energy of a molecule. This task is exponentially difficult in general for a classical computer, but efficiently solvable by a quantum computer. Estimating the molecular ground state has important applications to chemistry such as determining reaction rates and molecular geometry. A conventional quantum algorithm for solving this problem is the Quantum Phase Estimation (QPE) algorithm. However, for target precision ε, QPE yields a quantum circuit with depth $O(1/\varepsilon)$, whereas VQE algorithm yields $O(1/\varepsilon^2)$ iterations of depth $O(1)$ circuits. The latter assumes a more relaxed fidelity requirement on the qubits and gate operations, because the higher the circuit depth, the more likely the circuit experiences an error at the end. At a high level, VQE can be conceptualized as a guess-check-repeat algorithm, where the compilation engine 114 recompiles at each iteration for the next guess based on the results of previous executions. The check stage involves the preparation of a quantum state corresponding to the guess. This preparation stage is done in polynomial time on a quantum computer, but would incur exponential cost on a classical computer (e.g., due to $2^N$ state vector scaling).

In some example embodiments, the variational quantum program 112 may be a Quantum Approximate Optimization Algorithm (QAOA). The quantum computing system 100 may use QAOA to generate approximate solutions to problems that are difficult to solve exactly. QAOA can be understood as an alternating pattern of mixing and cost-optimization steps. At each mixing step, QAOA applies diffusion so that every possible state is explored in quantum superposition. At each cost-optimization step, a bias is applied to boost the magnitudes of quantum states that minimize a cost function. Thereafter, measuring can yield an approximate solution close to optimal with high probability. Similar to VOE, QAOA is a guess-check-repeat algorithm. The number of alternating mixing and cost-optimization rounds is p. In the case of QAOA, the guesses correspond to mixing magnitude during iteration 1≤i≤p and cost-optimization magnitude during iteration 1≤i≤p. Hence, the number of parameters in a QAOA circuit is 2p, one scalar for mixing magnitude and one for cost-optimization magnitude, for each of the p rounds. Even for small p, QAOA has competitive results against classical approximation methods. For example, at p=1, QAOA applied to the NP-hard MAX-CUT problem yields a cut of size at least 69% of the optimal cut size. At p=5, simulations have demonstrated that QAOA achieves mean parity with the best-known classical algorithm, Goemans-Williamson, for 10 node graphs. For larger p, QAOA may outperform classical approximation algorithms even for worst-case bounds. QAOA is of particular interest in the near term because recent work has shown that it is computationally universal. Moreover, QAOA has shown experimental resilience to noise. For at least these reasons, QAOA is a leading candidate for quantum supremacy, the solution of a classically-infeasible problem using a quantum computer.

Figure 2:
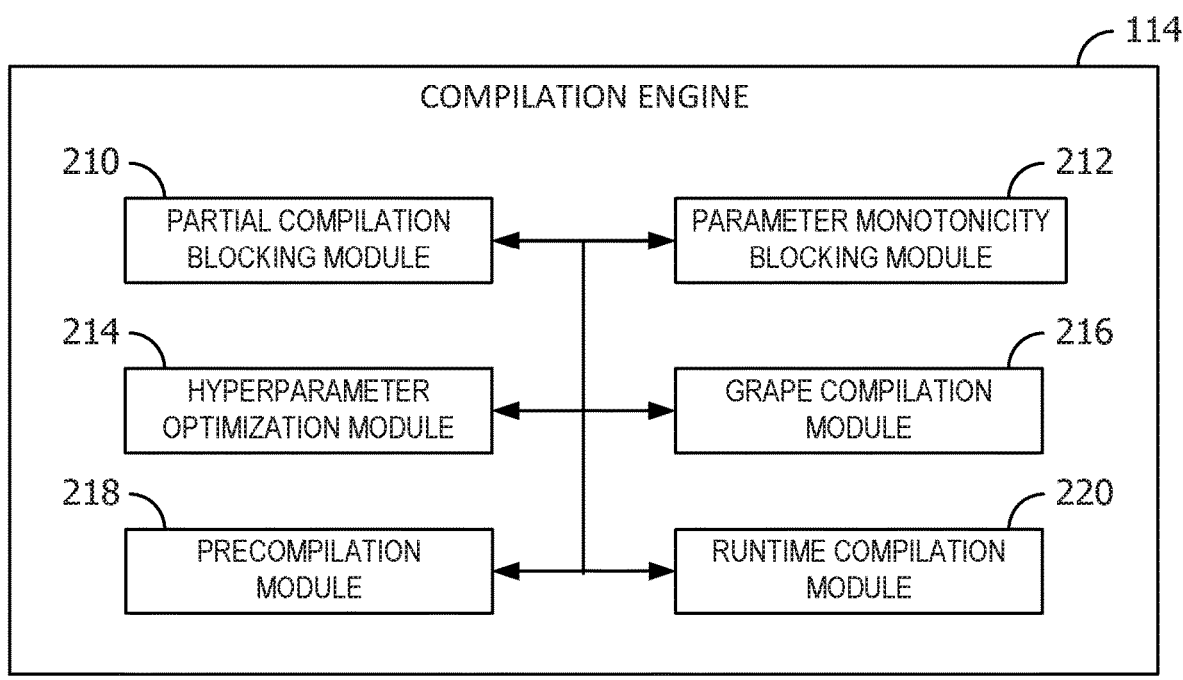

FIG. 2 is a component diagram of the compilation engine 114 shown in FIG. 1. The modules shown in FIG. 2 pre-compile the quantum program 112 and prepare the optimized physical schedule 116 for execution. In the example embodiment, the compilation engine 114 includes a partial compilation blocking module 210, a parameter monotonicity blocking module 212, a hyperparameter optimization module 214, a GRAPE compilation module 216, a precompilation module 218, and a runtime compilation module 220.

The partial compilation blocking module 210, in the example embodiment, is configured to analyze a variational circuit of the variational quantum program 112 shown in FIG. 1 and identify blocks of parameter-independent gates. Parameter-independent blocking is described below with respect to FIGS. 4A and 4B. The parameter monotonicity blocking module 212 is configured to analyze a variational circuit and create parameter-monotonic blocks of gates. Parameter-monotonic blocking is described below with respect to FIG. 4C. The hyperparameter optimization module 214 is configured to determine sets of hyperparameters for parameter-monotonic blocks. Hyperparameter optimization is descried in greater detail below with respect to FIG. 4C.

In the example embodiment, the GRAPE compilation engine 216 is configured to generate control pulses for various circuits and subcircuits, such as the blocks of parameter-independent gates identified by the partial compilation blocking module 210 or parameter-monotonic blocks identified by the parameter monotonicity blocking module 212. The precompilation module 218 is configured to invoke the partial compilation blocking module 210, parameter monotonicity blocking module 212, hyperparameter optimization module 214, and GRAPE compilation module 216 during compilation time (e.g., before runtime) to pre-stage various aspects of the algorithms as described herein. The runtime compilation module 220 is configured to perform recompilation of various subcircuits or reassemble components of circuits during runtime.

Figure 3:
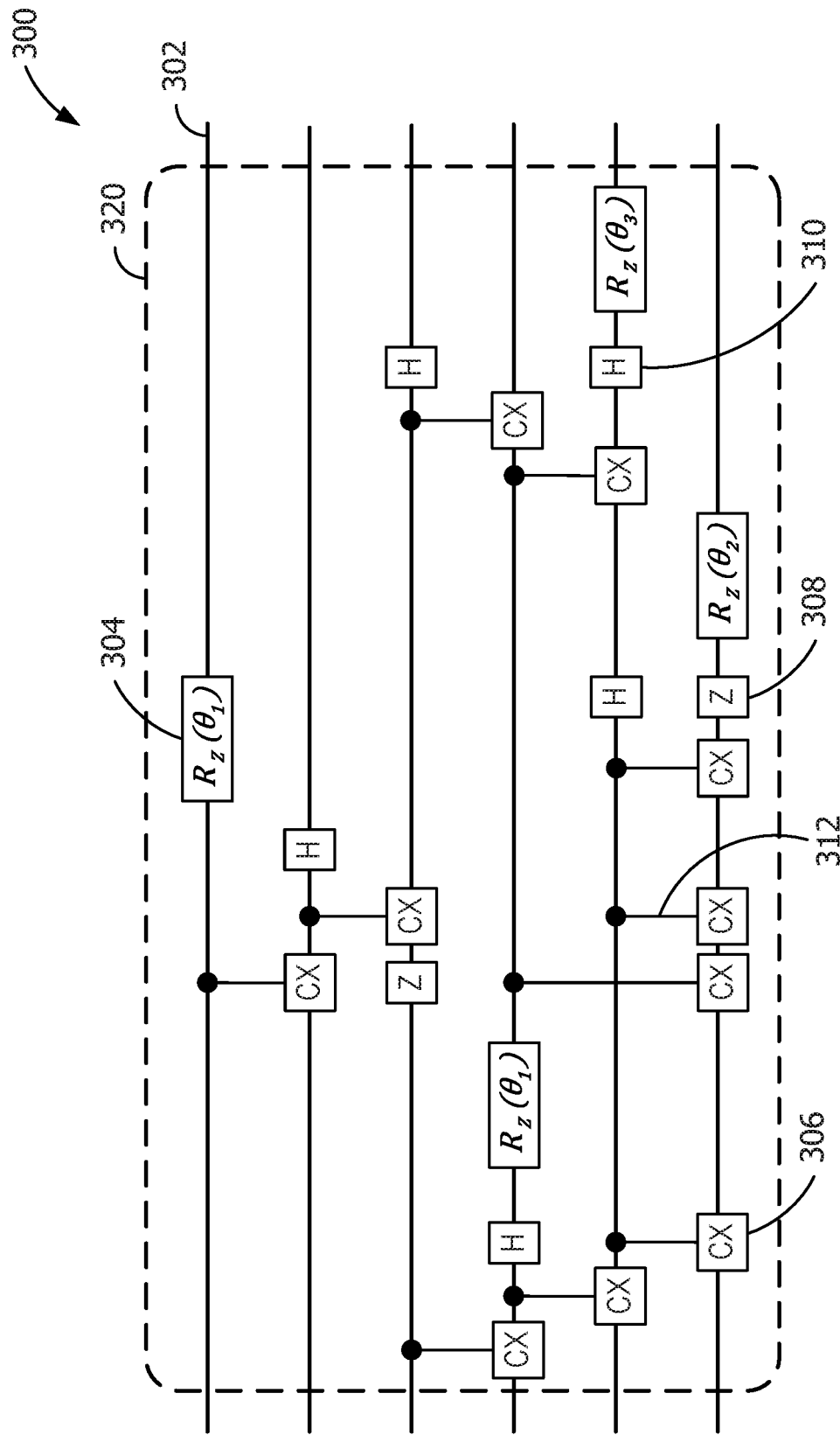

FIG. 3 is an example variational circuit 300 for the variational quantum program 112 shown in FIG. 1. In the example shown here, the variational circuit 300 has been decomposed into various 1- and 2-input quantum gates for a six-qubit quantum processor 132. The fundamental unit of quantum computation is the qubit (e.g., qubit 134). A qubit has two basis states, which may be represented by state vectors denoted:

$$|0\rangle = \begin{pmatrix} 1 \\ 0 \end{pmatrix} \text{ and } |1\rangle = \begin{pmatrix} 0 \\ 1 \end{pmatrix}.$$

Unlike a classical bit, the state of a qubit can be in a superposition of both $|0\rangle$ and $|1\rangle$. In particular, the space of valid qubit states are $\alpha|0\rangle+\beta|1\rangle$, normalized such that $|\alpha|^2+|\beta|^2=1$. When a qubit is measured, its quantum state collapses and either $|0\rangle$ or $|1\rangle$ are measured, with probabilities $\alpha^2$ and $\beta^2$, respectively.

A 2-qubit system has four basis states:

$$|00\rangle = \begin{pmatrix} 1 \\ 0 \\ 0 \\ 0 \end{pmatrix}, |01\rangle = \begin{pmatrix} 0 \\ 1 \\ 0 \\ 0 \end{pmatrix}, |10\rangle = \begin{pmatrix} 0 \\ 0 \\ 1 \\ 0 \end{pmatrix}, \text{ and } |11\rangle = \begin{pmatrix} 0 \\ 0 \\ 0 \\ 1 \end{pmatrix},$$

and any 2-qubit state can be expressed as the superposition $\alpha|00\rangle+\beta|01\rangle+\gamma|10\rangle+\delta|11\rangle$, normalized such that $|\alpha|^2+|\beta|^2+|\gamma|^2+|\delta|^2=1$. More generally, an N-qubit system has $2^N$ basis states. Therefore, $2^N$ numbers, called amplitudes, are needed to describe the state of a general N-qubit system. This exponential scaling gives rise to both the difficulty of classically simulating a quantum system, as well as the potential for quantum computers to exponentially outperform classical computers in certain applications.

In FIG. 3, each of the six horizontal lines 302 (not separately numbered) represent a particular qubit 134 of the quantum processor 132. FIG. 3 also identifies several 1- and 2-qubit gates that operate on the qubits. Quantum gates may be represented by a square matrix and the action of a gate is to left-multiply a state vector of the qubit(s) by the gate's matrix. Because quantum states are normalized by measurement probabilities, these matrices preserve $l^2$-norms. This corresponding set of matrices are unitary (orthogonal) matrices. The unitary matrices for two important 1-qubit gates are:

$$R_x(\theta) = \begin{pmatrix} i\cos\frac{\theta}{2} & \sin\frac{\theta}{2} \\ \sin\frac{\theta}{2} & i\cos\frac{\theta}{2} \end{pmatrix} \text{ and } R_z(\phi) = \begin{pmatrix} 1 & 0 \\ 0 & e^{i\phi} \end{pmatrix}.$$

At $\theta=\pi$, the $R_x(\pi)$ gate has a matrix $$\begin{pmatrix} 1 & 0 \\ 0 & -1 \end{pmatrix},$$

which acts as a NOT gate (e.g., left-multiplying by it swaps between the $|0\rangle$ and $|1\rangle$ states). This bit-flip gate is termed the "X" gate (not shown) herein. Similarly, at $\phi=\pi$, the $R_z(\pi)$ gate has a matrix $$\begin{pmatrix} 0 & 1 \\ 1 & 0 \end{pmatrix},$$

which applies a $-1$ multiplier to the amplitude of $|1\rangle$. This type of gate is unique to the quantum setting, where amplitudes can be negative (e.g., complex). This phase-flip gate is termed the "Z" gate 308 herein.

A "CX" gate 306 is a controlled NOT (or CNOT) represented as:

$$CX = \begin{pmatrix} 1 & 0 & 0 & 0 \\ 0 & 1 & 0 & 0 \\ 0 & 0 & 0 & 1 \\ 0 & 0 & 1 & 0 \end{pmatrix}.$$

The CX gate 306 applies an action that is controlled on a first input (e.g., the first qubit, identified in FIG. 3 as a shaded dot on the qubit connected to the CX gate 306 by a control line 312). If the first input is $|0\rangle$, then the CX gate 306 has no effect. If the first input is $|1\rangle$, then the CX gate 306 applies an X=$R_x(\pi)$ to the second qubit. The CX gate 306 is an entangling gate, meaning that its effect cannot be decomposed into independent gates acting separately on the two qubits. An important result in quantum computation states that the set of all 1-qubit gates, plus a single entangling gate, is sufficient for universality. Since the $R_x(\theta)$ and $R_z(\phi)$ gates span the set of all one qubit gates, $\{R_x(\theta), R_z(\phi), CX\}$ is a universal gate set.

During operation, the quantum computing system 100 prepares the quantum algorithm for execution, maximizing efficiency in the quantum circuit in various respects (e.g., in terms of "circuit width" or number of qubits and "depth" or length of critical path). For example, the quantum circuit 300 may optimized by repeatedly applying gate identities that reduce the resources consumed by the circuit 300. In some embodiments, the circuit 300 or various sub-circuits may be optimized using IBM Qiskit Transpiler, which applies a variety of circuit identities (e.g., aggressive cancellation of CX gates and Hadamard gates), as well as a customized compiler pass for merging rotation gates (e.g., $R_x(\alpha)$ followed by $R_x(\beta)$), which can further reduce circuit sizes.

In typical gate-based compilations, once a quantum program is decomposed into quantum circuit such as the circuit 300 shown here, gate-based compilation simply involves concatenating together sequences of pulses corresponding to each gate (e.g., via a lookup table mapping each gate into a sequence of control pulses that executes that gate). The advantage of the gate-based approach is its short pulse compilation time, as the lookup and concatenation of pulses can be accomplished very quickly. However, as previously mentioned, gate-based compilation prevents optimization of pulses from happening across gates.

In typical GRAPE compilations (referred to herein as "complete" GRAPE compilations), GRAPE numerically finds an efficient control pulse sequence needed to execute the entire quantum circuit 300, represented here by circuit 320, by following a gradient descent procedure. However, as previously mentioned, this compilation is computationally expensive when performed on the entire circuit 320, and that expense is exacerbated in variational algorithms, where compilation is performed again at each iteration.

In the example embodiment, the quantum computing system 100 addresses the deficiencies of gate-based compilation and complete GRAPE compilations. For example, in "strict partial compilation" and "flexible partial compilation" methods described herein, the quantum computing system 100 may analyze the circuit 300 to determine blocks of fixed gates that do not change from iteration to iteration. These fixed blocks may be pre-compiled and optimized individually (e.g., using GRAPE, referred to herein as a "partial" compilation), and then reused through the various iterations. These methods are described in greater detail below.

Figure 4A:
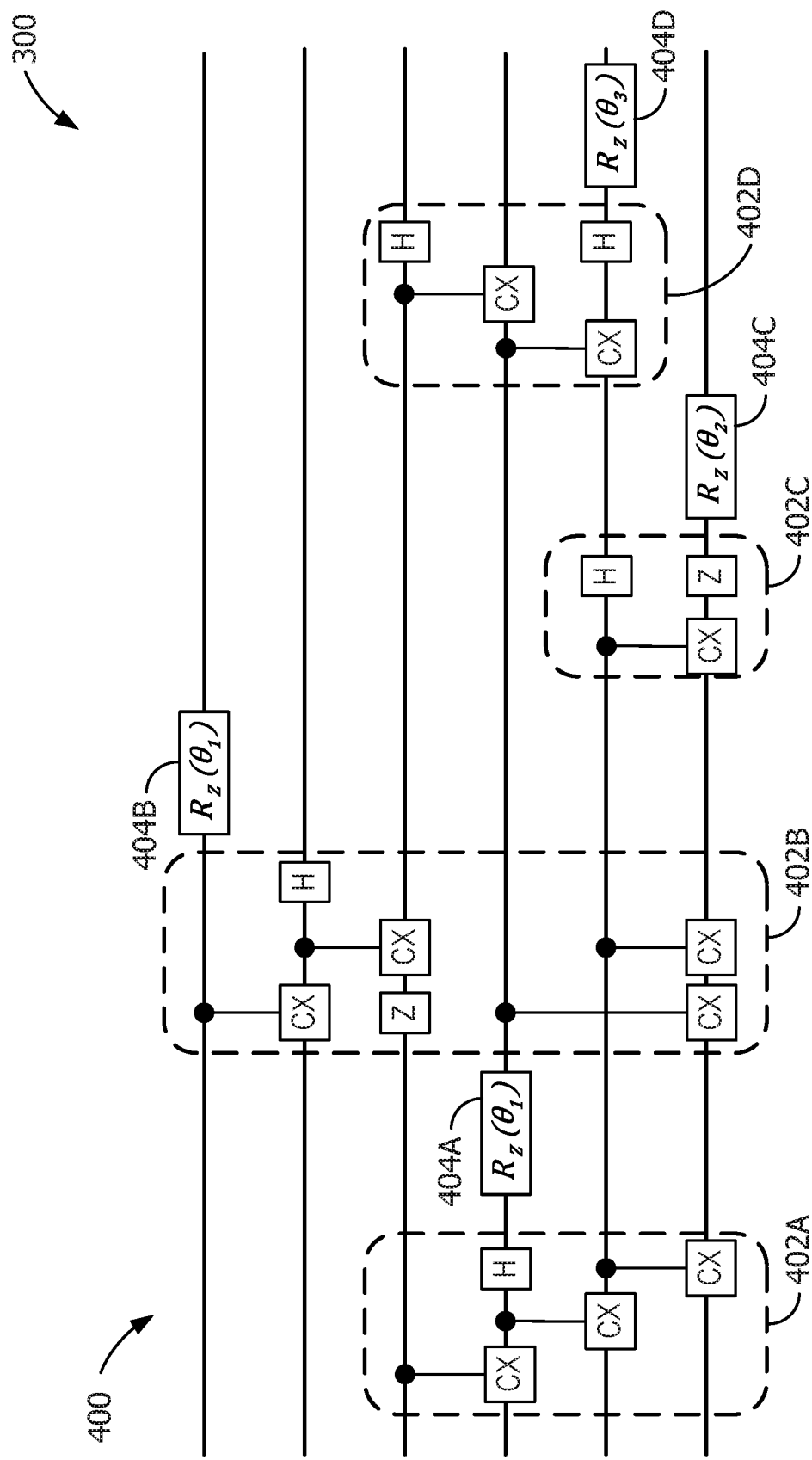
FIG. 4A illustrates the outcome of the blocking analysis (e.g., blocking out subcircuits that do not depend on any $\theta_i$ or $R_x(\theta_i)$ gates that do depend on the parameterization).
Figure 4B:
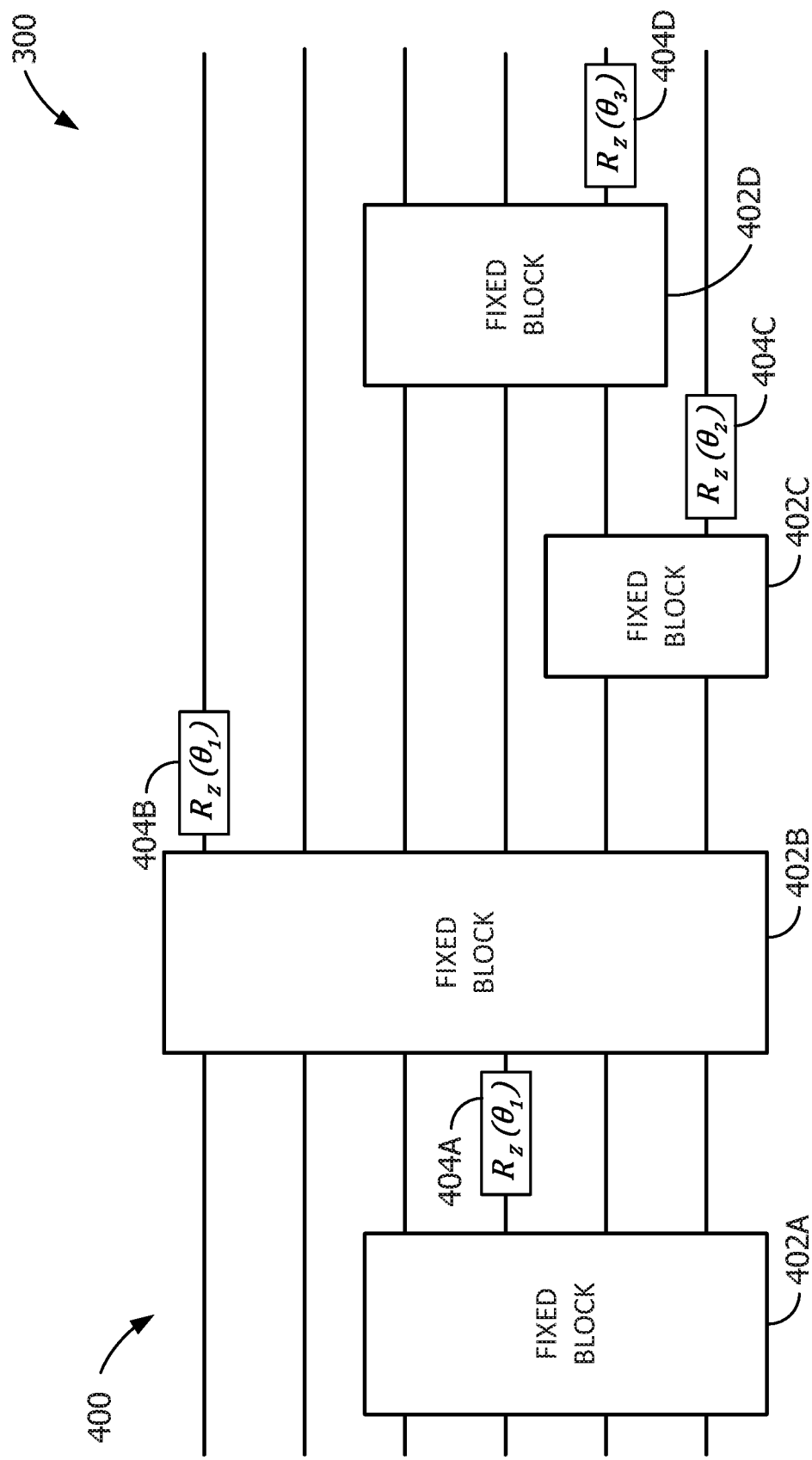
FIG. 4B illustrates another view of the blocking, now excluding the details of the parameterization-independent gates within each fixed block for purposes of illustration.

FIGS. 4A and 4B illustrate an example blocking map 400 of the circuit 300 identified by the compilation engine 114 prior to execution. In example embodiments for strict and flexible partial compilation methods, the compilation engine 114 performs blocking of the circuit 300 prior to execution (e.g., at compile time). Many variational algorithms contain sets of gates that do not change from iteration to iteration. More specifically, the compilation engine 114 identifies blocks of gates (or just "fixed blocks") 402 (e.g. one or more gates) that do not depend upon the variational parameters $\theta_i$ (e.g., parameterization-independent gates or subcircuits). All of the other variational parameterization-dependent gates (or subcircuits) 404 are excluded from the fixed blocks 402 but remain a part of the circuit. Variational parameters $\theta_i$ may be specific to the type of variational algorithm. The variational parameters $\theta_i$ may be relatively small (e.g., polynomial) number of parameters of an Ansatz that represent different underlying meanings or may simply add degrees of freedom that permit greater state exploration. In QAOA, the variational parameters $\theta_i$ may correspond to the magnitude of exploration versus exploitation performed at each of the p rounds. In VQE, the variational parameters $\theta_i$ may be described as capturing an amount of deviation from a reference guess (e.g., a Hartree-Fock) of a ground state of a molecule.

FIG. 4A illustrates the outcome of the blocking analysis (e.g., blocking out subcircuits that do not depend on any $\theta_i$ or $R_x(\theta_i)$ gates that do depend on the parameterization). FIG. 4B illustrates another view of the blocking, now excluding the details of the parameterization-independent gates within each fixed block 402 for purposes of illustration.

In strict partial compilation, once the compilation engine 114 performs the blocking and generates the blocking map 400 shown here, the compilation engine 114 pre-compiles each of the fixed blocks 402. In the example embodiment, the compilation engine 114 uses GRAPE on each fixed block 402 (e.g., as a subcircuit) to precompute the shortest pulse sequence needed to execute each fixed subcircuit. These static, precompiled pulse sequences can be defined as micro-instructions in a low-level assembly such as eQASM. The compilation engine 114 stores the precompiled fixed-block pulse sequences in a fixed-block lookup table for use during runtime. Further, the compilation engine 114 also generates a non-fixed lookup table for the parameterization-dependent portions (e.g., parameterization-dependent gates 404, $R_z(\theta_i)$ gates). More specifically, the compilation engine 114 pre-compiles pulses for $R_z(\theta_i)$ gates at values of $\theta_i$=90, 45, 22.5, 11.25, 5.625, and so forth (in degrees, e.g., dividing by two). Thereafter, at runtime, the compilation engine 114 can generate any $R_z(\theta_x)$ by adding together the stored pulses from the non-fixed lookup table for angles adding up to $\theta_x$. As such, the pulse sequence for any parameterization can be generated by simply concatenating the pre-computed pulse sequences for the fixed blocks 402 from the fixed-block lookup table with the control pulses for the parameterization-dependent portions (e.g., parameterization-dependent gates 404, $R_z(\theta_i)$ gates) from the non-fixed lookup table. In some embodiments, the optimal pulse for $\theta_i$ may be solved for analytically (e.g., for single-qubit simple gates, such as $R_z$). Since each fixed block 402 was compiled by GRAPE, the resulting pulse duration is shorter than if the fixed blocks 402 had been compiled by gate-based compilation. Thus, strict partial compilation achieves pulse speedups over gate-based compilation with minimal increase in compilation latency.

Figure 4C:
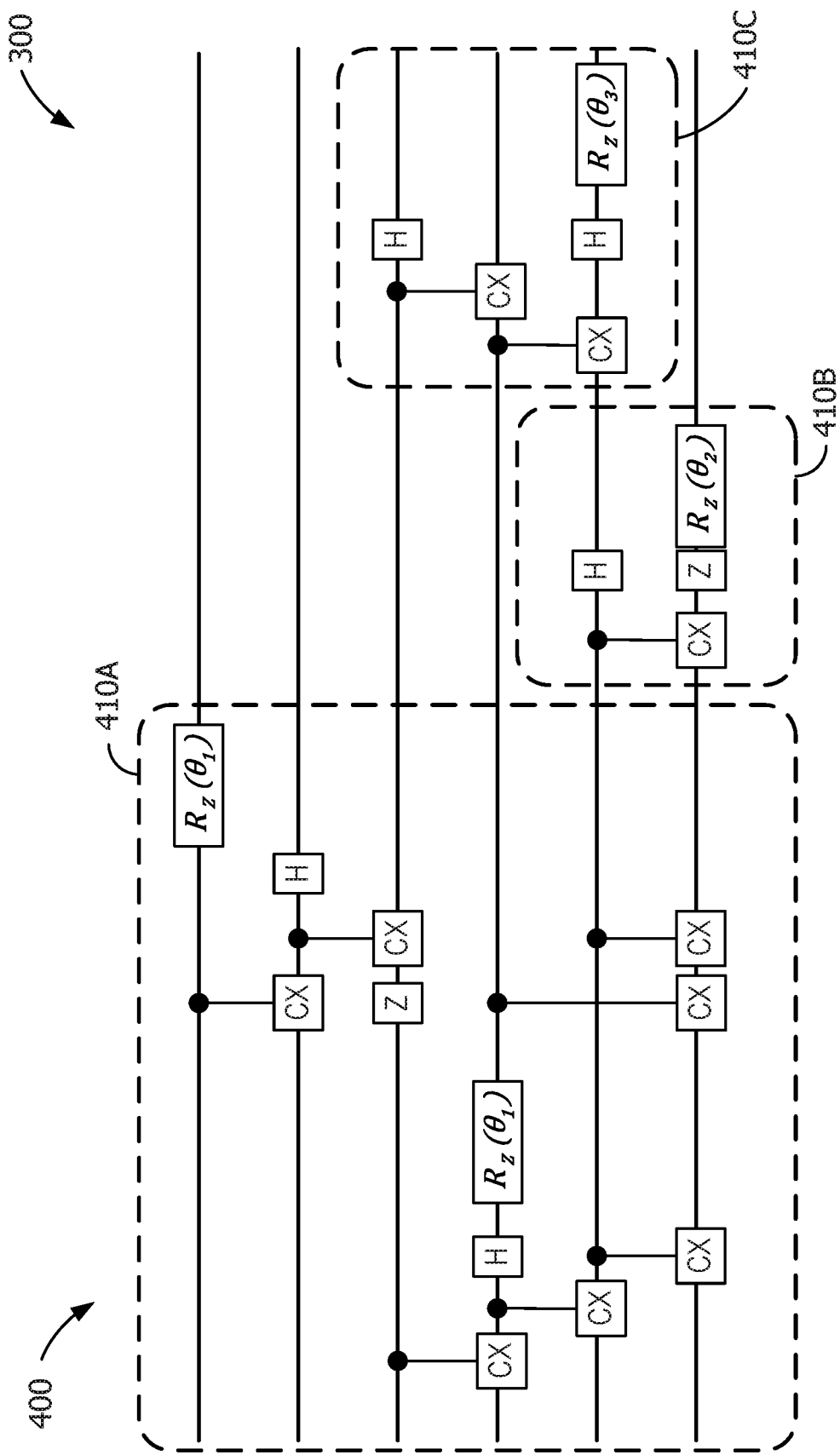

FIG. 4C illustrates blocking of parameterized subcircuits that depend on only a single variational parameter. In flexible partial compilation, subcircuits are created that are only slightly parameterized (e.g., depend on only one of the $\theta_i$ variational parameters). In the example embodiment, the compilation engine 114 merges all of the consecutive fixed blocks and parameter-dependent gates or subcircuits of the same variational parameter, $\theta_i$, together into parameter-monotonic blocks 410. Each resulting parameter-monotonic block is dependent upon only one variational parameter, $\theta_i$. For example, block 410A is dependent upon only $\theta_1$, block 410B is dependent upon only $\theta_2$, and block 410C is dependent upon only $\theta_3$.

In the example embodiment, it is noted that, for example, in VQE and QAOA circuits, the appearances of $\theta_i$-dependent gates is monotonic in i once a $\theta_i$-dependent gate appears, the subsequent parameterization-dependent gates are $\theta_j$ for j≥i. As a result, subcircuits with the same value of $\theta_i$ are consecutive. For example, the sequence of angles in parameterization-dependent gates may be $[\theta_1, \theta_1, \theta_2, \theta_3]$, but not $[\theta_1, \theta_2, \theta_3, \theta_1]$. Parameter monotonicity for VQE/UCCSD and QAOA arise because their circuit constructions sequentially apply a circuit corresponding to each parameter exactly once. For instance, in QAOA, each parameter corresponds to the magnitude of mixing or cost-optimization during the $i_{th}$ round. Once the corresponding mixing or cost-optimization has been applied, the circuit no longer depends on that parameter. Parameter monotonicity is not immediately obvious from visual inspection of variational circuits because the circuit constructions and optimizations transform individual $\theta_i$-dependent gates to ones that are parameterized in terms of $-\theta_i$ or $\theta_i/2$.

In the example embodiment, these latent dependencies are tracked and resolved by tagging the dependent parameter during the variational circuit construction phase. More specifically, any time a new $\theta_i$ is created, that $\theta_i$ is added to a list of tracked independent parameters. A pointer is added from $\theta_i$ to the list of tracked independent parameters. As such, subsequent operations on that $\theta_i$ may change the effective angle from $\theta_i$ to $\theta_{i/2}$, $\theta_{i/3}$, an so forth. The reference to $\theta_i$ is still tracked and, as such, these known $\theta_i$'s are not new angles. For example, presume a quantum circuit with two parameters, $\theta_1$ and $\theta_2$. After circuit optimizations, there is an $R_z(\theta_{1/2})$ gate. Now suppose that $\theta_1$=10 degrees and $\theta_2$=30 degrees. The quantum circuit has three angles: 5 degrees, 10 degrees, and 30 degrees. However, since the 5 degree rotation is tagged as still being dependent on $\theta_1$, the 5 degree rotation may fall under the same parameter dependent block (e.g., dependent on $\theta_1$) as the 10 degree rotation.

Once the compilation engine 114 analyzes the circuit 300 and performs parameter-monotonic blocking, the compilation engine 114 may perform an angle approximation method or a hyperparameter optimization method based on the parameter monotonic blocking.

In the angle approximation method, the compilation engine 114 precompiles a circuit for various angles (e.g., 0, 15, 30, 45, . . . , 345 degrees) for each of the parameter-monotonic blocks 410. At runtime, the closest pre-compiled circuit for the current angle is used as an initial guess (e.g., a seed). The solver will converge on an actual solution much faster with a closer guess. If the angles are close in result, the pulse sequence also tends to be close and converges faster. In some embodiments, the compilation engine 114 may precompile a circuit for various sets of two or more angles. For example, the compilation engine 114 may precompile a circuit for various pairs of angles, such as (0, 0), (0, 15), (0, 30), . . . , (0, 345), (15, 0), (15, 15), (15, 30), . . . , (345, 345).

In the hyperparameter optimization method, the compilation engine 114 precomputes hyperparameters for each parameter-monotonic block 410 that can be used during runtime to converge much faster to the optimal pulse sequence for each block 410. In GRAPE, an optimal control pulse is one that minimizes a set of cost functions corresponding to control amplitude, target state infidelity, and evolution time, amongst others. To obtain an optimal control pulse, the GRAPE algorithm manipulates a set of time-discrete control fields that act on a quantum system. It may analytically compute gradients of the cost function to be minimized with respect to the control fields. These gradients are used to update control fields with an optimizer such as ADAM or L-BFGS-B. As opposed to the control fields, which are parameters manipulated by GRAPE, these optimizers have their own parameters such as learning rate and learning rate decay. These parameters are termed "hyperparameters" because they are set before the learning process begins. Since they are inputs to the learning process, there is no closed form expression relating to hyperparameters and the cost functions a learning model is minimizing. In the example embodiment, hyperparameter optimization is employed on GRAPE ADAM optimizer, realizing faster convergence to a desired error rate over a baseline, significantly reducing compilation latency.

As such, in the example embodiment, the compilation engine 114 precomputes hyperparameter configurations for each single-angle parameterized subcircuit (e.g., each block 410) and uses those hyperparameter configurations at each compilation. For each iteration of the variational algorithm, the argument of the $\theta_i$-dependent gates of each subcircuit 410 will change, but the same hyperparameters are specified to the GRAPE optimizer, maintaining the same reduced compilation latency.

As will be appreciated based on the foregoing specification, the above-described embodiments of the disclosure may be implemented using computer programming or engineering techniques including computer software, firmware, hardware or any combination or subset thereof, wherein the technical effect is to compile and optimize a variational quantum program for execution on a quantum processor. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

In some embodiments, a quantum computing system for compiling and executing instructions on a quantum processor is provided. The quantum computing system includes the quantum processor including a plurality of qubits, a classical memory including a quantum program, the quantum program defines a plurality of instructions in a source language, and a classical processor communicatively coupled to the classical memory. The memory including computer-executable instructions that, when executed by the classical processor, cause the classical processor to: (i) receive a circuit of gates representing a quantum program for a variational algorithm in which computation is interleaved with compilation at each iteration; (ii) identify a plurality of blocks within the circuit of gates, each block of the plurality of blocks includes a subcircuit of gates from the circuit of gates, leaving one or more remainder subcircuits of the circuit of gates outside of the plurality of blocks; (iii) pre-compile each block of the plurality of blocks with a pulse generation program to generate a plurality of pre-compiled blocks, each pre-compiled block including control pulses configured to perform the associated block on the quantum processor; and (iv) iteratively execute the quantum program on the quantum processor using the pre-compiled blocks as static during runtime and recompiling the one or more remainder subcircuits on the classical processor at each iteration of execution.

In some embodiments, the quantum computing system iteratively executing the quantum program includes, at each iteration of execution: (a) compile each remainder subcircuit of the one or more remainder subcircuits to generate a plurality of compiled remainder subcircuits; (b) concatenate the plurality of pre-compiled blocks and the plurality of compiled remainder subcircuits based on their relative positions within the circuit of gates, thereby creating control pulses for a present iteration of execution; and (c) execute the control pulses for the present iteration of execution on the quantum processor. In some embodiments, compiling each remainder subcircuit of the one or more remainder subcircuits includes compiling a first remainder subcircuit with gradient ascent pulse engineering. In some embodiments, identifying a plurality of blocks within the circuit of gates includes identifying a block within the circuit of gates based on variational parameter independence. In some embodiments, identifying a block within the circuit of gates further includes blocking all variational parameter-independent gates between two variational parameter-dependent gates. In some embodiments, the computer-executable instructions further cause the classical processor to identify a plurality of parameter-monotonic blocks based on subcircuits within the circuit of gates that depend on at most one variational parameter of the variational algorithm. In some embodiments, the computer-executable instructions further cause the classical processor to precompute hyperparameter configurations for each parameter-monotonic block of the plurality of parameter-monotonic blocks for use during iterative execution.

In some embodiments, a method for compiling and executing instructions on a quantum computer is provided. The method is implemented using a classical processor in communication with a classical memory. The method includes: (i) receiving a circuit of gates representing a quantum program for a variational algorithm; (ii) identifying a plurality of blocks within the circuit of gates, each block of the plurality of blocks includes a subcircuit of gates from the circuit of gates, leaving one or more remainder subcircuits of the circuit of gates outside of the plurality of blocks; (iii) pre-compiling each block of the plurality of blocks with gradient ascent pulse engineering to generate a plurality of pre-compiled blocks, each pre-compiled block including control pulses configured to perform the associated block on a quantum processor; and (iv) iteratively executing the quantum program on the quantum processor using the pre-compiled blocks as static during runtime and recompiling the one or more remainder subcircuits on the classical processor at each iteration of execution.

In some embodiments, iteratively executing the quantum program includes, at each iteration of execution: (a) compile each remainder subcircuit of the one or more remainder subcircuits to generate a plurality of compiled remainder subcircuits; (b) concatenate the plurality of pre-compiled blocks and the plurality of compiled remainder subcircuits based on their relative positions within the circuit of gates, thereby creating control pulses for a present iteration of execution; and (c) execute the control pulses for the present iteration of execution on the quantum processor. In some embodiments, compiling each remainder subcircuit of the one or more remainder subcircuits includes compiling a first remainder subcircuit with gradient ascent pulse engineering. In some embodiments, identifying a plurality of blocks within the circuit of gates includes identifying a block within the circuit of gates based on variational parameter independence. In some embodiments, identifying a block within the circuit of gates further includes blocking all variational parameter-independent gates between two variational parameter-dependent gates. In some embodiments, the method further includes identifying a plurality of parameter-monotonic blocks based on subcircuits within the circuit of gates that depend on at most one variational parameter of the variational algorithm. In some embodiments, the method further includes precomputing hyperparameter configurations for each parameter-monotonic block of the plurality of parameter-monotonic blocks for use during iterative execution.

In some embodiments, a non-transitory computer-readable storage media having computer-executable instructions embodied thereon is provided. When executed by at least one classical processor, the computer-executable instructions cause the classical processor to: (i) receive a circuit of gates representing a quantum program for a variational algorithm; (ii) identify a plurality of blocks within the circuit of gates, each block of the plurality of blocks includes a subcircuit of gates from the circuit of gates, leaving one or more remainder subcircuits of the circuit of gates outside of the plurality of blocks; (iii) pre-compile each block of the plurality of blocks with gradient ascent pulse engineering to generate a plurality of pre-compiled blocks, each pre-compiled block including control pulses configured to perform the associated block on the quantum processor; and (iv) iteratively execute the quantum program on a quantum processor using the pre-compiled blocks as static during runtime and recompiling the one or more remainder subcircuits on the classical processor at each iteration of execution.

In some embodiments, iteratively executing the quantum program includes, at each iteration of execution: (a) compile each remainder subcircuit of the one or more remainder subcircuits to generate a plurality of compiled remainder subcircuits; (b) concatenate the plurality of pre-compiled blocks and the plurality of compiled remainder subcircuits based on their relative positions within the circuit of gates, thereby creating control pulses for a present iteration of execution; and (c) execute the control pulses for the present iteration of execution on the quantum processor. In some embodiments, compiling each remainder subcircuit of the one or more remainder subcircuits includes compiling a first remainder subcircuit with gradient ascent pulse engineering. In some embodiments, identifying a plurality of blocks within the circuit of gates includes identifying a block within the circuit of gates based on variational parameter independence. In some embodiments, the computer-executable instructions further cause the classical processor to identify a plurality of parameter-monotonic blocks based on subcircuits within the circuit of gates that depend on at most one variational parameter of the variational algorithm. In some embodiments, the computer-executable instructions further cause the classical processor to precompute hyperparameter configurations for each parameter-monotonic block of the plurality of parameter-monotonic blocks for use during iterative execution.

These conventional computer programs (also known as programs, software, software applications, "apps", or code) include machine instructions for a conventional programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A quantum computing system for compiling and executing instructions on a quantum processor having a plurality of qubits, the quantum computing system comprising:
   a classical memory including a quantum program, the quantum program defines a plurality of instructions in a source language; and
   a classical processor communicatively coupled to the classical memory, the classical memory including computer-executable instructions that, when executed by the classical processor, cause the classical processor to:
     receive a circuit of gates representing the quantum program for a variational algorithm in which computation is interleaved with compilation at each iteration;
     identify a plurality of blocks within the circuit of gates, each block of the plurality of blocks includes a subcircuit of gates from the circuit of gates, leaving one or more remainder subcircuits of the circuit of gates outside of the plurality of blocks;
     pre-compile each block of the plurality of blocks with a pulse generation program to generate a plurality of pre-compiled blocks, each pre-compiled block including control pulses configured to perform the associated block on the quantum processor; and
     iteratively execute the quantum program on the quantum processor using the pre-compiled blocks as static during runtime and recompiling the one or more remainder subcircuits on the classical processor at each iteration of execution.

2. The quantum computing system of claim 1, wherein iteratively executing the quantum program includes:
   at each iteration of execution:
     compile each remainder subcircuit of the one or more remainder subcircuits to generate a plurality of compiled remainder subcircuits;
     concatenate the plurality of pre-compiled blocks and the plurality of compiled remainder subcircuits based on their relative positions within the circuit of gates, thereby creating control pulses for a present iteration of execution; and
     execute the control pulses for the present iteration of execution on the quantum processor.

3. The quantum computing system of claim 2, wherein compiling each remainder subcircuit of the one or more remainder subcircuits includes compiling a first remainder subcircuit with gradient ascent pulse engineering.

4. The quantum computing system of claim 1, wherein identifying a plurality of blocks within the circuit of gates includes identifying a block within the circuit of gates based on variational parameter independence.

5. The quantum computing system of claim 4, wherein identifying a block within the circuit of gates further includes blocking all variational parameter-independent gates between two variational parameter-dependent gates.

6. The quantum computing system of claim 1, wherein the computer-executable instructions further cause the classical processor to identify a plurality of parameter-monotonic blocks based on subcircuits within the circuit of gates that depend on at most one variational parameter of the variational algorithm.

7. The quantum computing system of claim 6, wherein the computer-executable instructions further cause the classical processor to precompute hyperparameter configurations for each parameter-monotonic block of the plurality of parameter-monotonic blocks for use during iterative execution.

8. A method for compiling and executing instructions on a quantum computer, the method is implemented using a classical processor in communication with a classical memory, the method comprising:
receiving a circuit of gates representing a quantum program for a variational algorithm;
identifying a plurality of blocks within the circuit of gates, each block of the plurality of blocks includes a subcircuit of gates from the circuit of gates, leaving one or more remainder subcircuits of the circuit of gates outside of the plurality of blocks;
pre-compiling each block of the plurality of blocks with gradient ascent pulse engineering to generate a plurality of pre-compiled blocks, each pre-compiled block including control pulses configured to perform the associated block on a quantum processor; and
iteratively executing the quantum program on the quantum processor using the pre-compiled blocks as static during runtime and recompiling the one or more remainder subcircuits on the classical processor at each iteration of execution.

9. The method of claim 8, wherein iteratively executing the quantum program includes:
at each iteration of execution:
compile each remainder subcircuit of the one or more remainder subcircuits to generate a plurality of compiled remainder subcircuits;
concatenate the plurality of pre-compiled blocks and the plurality of compiled remainder subcircuits based on their relative positions within the circuit of gates, thereby creating control pulses for a present iteration of execution; and
execute the control pulses for the present iteration of execution on the quantum processor.

10. The method of claim 9, wherein compiling each remainder subcircuit of the one or more remainder subcircuits includes compiling a first remainder subcircuit with gradient ascent pulse engineering.

11. The method of claim 8, wherein identifying a plurality of blocks within the circuit of gates includes identifying a block within the circuit of gates based on variational parameter independence.

12. The method of claim 11, wherein identifying a block within the circuit of gates further includes blocking all variational parameter-independent gates between two variational parameter-dependent gates.

13. The method of claim 8 further comprising identifying a plurality of parameter-monotonic blocks based on subcircuits within the circuit of gates that depend on at most one variational parameter of the variational algorithm.

14. The method of claim 13 further comprising precomputing hyperparameter configurations for each parameter-monotonic block of the plurality of parameter-monotonic blocks for use during iterative execution.

15. A non-transitory computer-readable storage media having computer-executable instructions embodied thereon, wherein when executed by at least one classical processor, the computer-executable instructions cause the classical processor to:
receive a circuit of gates representing a quantum program for a variational algorithm;
identify a plurality of blocks within the circuit of gates, each block of the plurality of blocks includes a subcircuit of gates from the circuit of gates, leaving one or more remainder subcircuits of the circuit of gates outside of the plurality of blocks;
pre-compile each block of the plurality of blocks with gradient ascent pulse engineering to generate a plurality of pre-compiled blocks, each pre-compiled block including control pulses configured to perform the associated block on a quantum processor; and
iteratively execute the quantum program on the quantum processor using the pre-compiled blocks as static during runtime and recompiling the one or more remainder subcircuits on the classical processor at each iteration of execution.

16. The non-transitory computer-readable storage media of claim 15, wherein iteratively executing the quantum program includes:
at each iteration of execution:
compile each remainder subcircuit of the one or more remainder subcircuits to generate a plurality of compiled remainder subcircuits;
concatenate the plurality of pre-compiled blocks and the plurality of compiled remainder subcircuits based on their relative positions within the circuit of gates, thereby creating control pulses for a present iteration of execution; and
execute the control pulses for the present iteration of execution on the quantum processor.

17. The non-transitory computer-readable storage media of claim 16, wherein compiling each remainder subcircuit of the one or more remainder subcircuits includes compiling a first remainder subcircuit with gradient ascent pulse engineering.

18. The non-transitory computer-readable storage media of claim 15, wherein identifying a plurality of blocks within the circuit of gates includes identifying a block within the circuit of gates based on variational parameter independence.

19. The non-transitory computer-readable storage media of claim 15, wherein the computer-executable instructions further cause the classical processor to identify a plurality of parameter-monotonic blocks based on subcircuits within the circuit of gates that depend on at most one variational parameter of the variational algorithm.

20. The non-transitory computer-readable storage media of claim 19, wherein the computer-executable instructions further cause the classical processor to precompute hyperparameter configurations for each parameter-monotonic block of the plurality of parameter-monotonic blocks for use during iterative execution.

* * * * *